United States Patent
Tammi et al.

(10) Patent No.: US 9,894,454 B2
(45) Date of Patent: Feb. 13, 2018

(54) MULTI-CHANNEL AUDIO CAPTURE IN AN APPARATUS WITH CHANGEABLE MICROPHONE CONFIGURATIONS

(71) Applicant: Nokia Corporation, Espoo (FI)

(72) Inventors: Mikko Tapio Tammi, Tampere (FI); Miikka Tapani Vilermo, Siuro (FI); Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 132 days.

(21) Appl. No.: 14/061,041

(22) Filed: Oct. 23, 2013

(65) Prior Publication Data

US 2015/0110275 A1 Apr. 23, 2015

(51) Int. Cl.
*H04S 7/00* (2006.01)
*H04R 1/08* (2006.01)
(Continued)

(52) U.S. Cl.
CPC ............. *H04S 7/301* (2013.01); *H04R 1/028* (2013.01); *H04R 1/08* (2013.01); *H04R 1/406* (2013.01);
(Continued)

(58) Field of Classification Search
CPC . H04R 1/028; H04R 1/08; H04R 1/40; H04R 3/005; H04R 5/027; H04R 29/005; H04R 2201/40; H04R 2201/401; H04R 2201/403; H04R 2201/405; H04R 2499/11; H04R 2499/15; H04S 7/301;
(Continued)

(56) References Cited

U.S. PATENT DOCUMENTS

| 7,920,698 B1 | 4/2011 | Mikan et al. |
| 7,966,178 B2 | 6/2011 | Gustavsson |

(Continued)

FOREIGN PATENT DOCUMENTS

| JP | 2004198331 A | 7/2004 |
| JP | 2005/286718 A | 10/2005 |

(Continued)

OTHER PUBLICATIONS

Bartlett, B.; "Stereo Microphone Techniques"; 2006; whole document (8 pages); Deltamedia International; Gausti, CA, USA; Downloaded from the Internet, URL: http://www.deitamedia.com/resource/stereo_microphone_techniques.html.

(Continued)

*Primary Examiner* — Mark Fischer
(74) *Attorney, Agent, or Firm* — Harrington & Smith

(57) ABSTRACT

An apparatus comprises at least one processor, and at least one memory including computer program code, the at least one memory and the computer program code configured to, with the at least one processor, cause the apparatus to: provide an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second position of a second microphone configuration on a second portion, the second portion being movable relative to the first portion.

18 Claims, 7 Drawing Sheets

(51) Int. Cl.
*H04R 1/02* (2006.01)
*H04R 1/40* (2006.01)
*H04R 3/00* (2006.01)
*H04R 5/027* (2006.01)
*H04M 1/03* (2006.01)

(52) U.S. Cl.
CPC ............. *H04R 3/005* (2013.01); *H04R 5/027* (2013.01); *H04M 1/03* (2013.01); *H04R 2201/40* (2013.01); *H04R 2499/11* (2013.01); *H04R 2499/15* (2013.01); *H04S 2400/15* (2013.01)

(58) Field of Classification Search
CPC ............. H04M 1/0235; H04M 1/0237; H04M 1/0239; H04M 1/03; G10L 2021/02165; G10L 2021/02166
See application file for complete search history.

(56) References Cited

U.S. PATENT DOCUMENTS

| | | | |
|---|---|---|---|
| 2005/0265559 A1* | 12/2005 | Asada | H04S 7/301 381/18 |
| 2006/0239471 A1 | 10/2006 | Mao et al. | |
| 2008/0201138 A1* | 8/2008 | Visser | G10L 21/0208 704/227 |
| 2011/0158425 A1 | 6/2011 | Hayakawa | |
| 2012/0013750 A1* | 1/2012 | Heise | H04R 5/027 348/207.1 |
| 2012/0128174 A1 | 5/2012 | Tammi et al. | |
| 2012/0163606 A1* | 6/2012 | Eronen et al. | 381/22 |
| 2012/0224716 A1 | 9/2012 | Ohtsuka | |
| 2013/0044884 A1 | 2/2013 | Tammi et al. | |
| 2013/0156207 A1* | 6/2013 | Visser et al. | 381/57 |
| 2013/0202114 A1 | 8/2013 | Tammi et al. | |
| 2014/0278387 A1* | 9/2014 | DiGregorio | G10L 25/48 704/231 |

FOREIGN PATENT DOCUMENTS

| | | |
|---|---|---|
| WO | 2010014074 A1 | 2/2010 |
| WO | 2011000409 A1 | 1/2011 |

OTHER PUBLICATIONS

"Blind Upmix of Stereo Music Signals Using Multi-Step Linear Prediction Based Reverberation Extraction"; 2010 IEEE International Conference on Acoustics Speech and Signal processing (ICASSP), Mar. 14-19, 2010, Dallas, TX, USA; pp. 49-52.

* cited by examiner

MULTI-CHANNEL AUDIO CAPTURE IN AN APPARATUS WITH CHANGEABLE MICROPHONE CONFIGURATIONS

BACKGROUND

Technical Field

The exemplary and non-limiting embodiments described herein relate generally to the detection and capture of audio signals and, more particularly, to the analysis of directional information of audio signals detected and captured by a mobile device.

Brief Description of Prior Developments

Spatial audio capture involves the capture of sound for the subsequent reproduction and artificial re-creation of the sound. One type of spatial audio capture is binaural audio capture, in which microphones capture directional information as sound in a horizontal plane for the re-creation of the sound via speakers arranged to produce a three-dimensional (3-D) audio sensation through headphones. Another type of spatial audio capture is multichannel 5.1 audio capture, in which microphones capture directional information as sound in the horizontal plane and re-create that sound through five full-bandwidth channels and one low frequency effect channel to produce a 3-D audio sensation.

SUMMARY

The following summary is merely intended to be exemplary. The summary is not intended to limit the scope of the claims.

In accordance with one aspect, an apparatus comprises: at least one processor, and at least one memory including computer program code, the at least one memory and the computer program code configured to, with the at least one processor, cause the apparatus to: provide an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second position of a second microphone configuration on a second portion, the second portion being movable relative to the first portion.

In accordance with another aspect, a method comprises providing an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second position of a second microphone configuration on a second portion, the second portion being movable relative to the first portion.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1A:
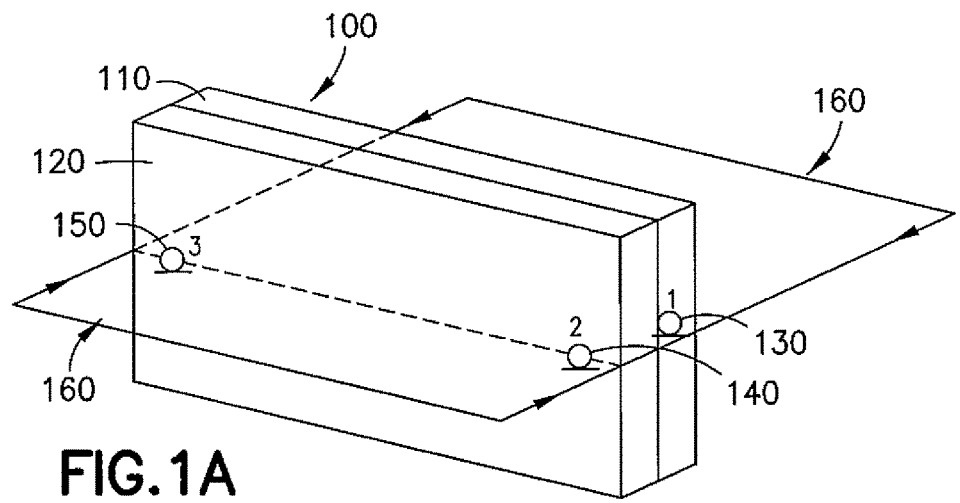
FIG. 1A is a perspective view of a mobile device in a video capture orientation.

Directional detection of sounds from one or more sound sources is optimal when the sound sources are arranged on the same plane with three or more directional microphones. In detecting the direction of sounds through such microphones, whether the sound source is located above or below a horizontal plane cannot be discerned. Nevertheless, when the microphone plane is horizontal, knowing whether the sound source was above or below the plane is of little value, since playback of the sound in a multichannel 5.1 audio format cannot reproduce sounds from above or below the horizontal plane. Furthermore, knowing whether the sound is above or below the horizontal plane is not very useful for playback in a binaural format. On the other hand, if the microphone plane is vertical, then "above the plane" can refer to "in front of the device" and "below the plane" can refer to "behind the device" (or vice versa). In vertical orientations of the microphone plane, whether the sound emanates from in front of or behind the device is useful information.

Stereo audio can be recorded with two omni-directional microphones that are separated from each other in a horizontal direction. Directional microphones generally cannot be used for recording stereo audio in such a configuration because of their directionality, which facilitates their operability only in certain orientations.

However, there are many uses for directional microphones in mobile devices. Such uses include, for example, surround sound capture for video recordings and surround sound teleconferencing. In any use, however, the microphones provide for an audio capture event such as a pure audio capture (receipt of audio without further processing), audio recording, audio/visual recording, or any other use case associated with receiving an audio signal.

A mobile device may be used in different physical orientations depending on the use scenario. Video is usually recorded on a mobile device when the mobile device is in a landscape orientation. In teleconferencing in which multiple people are providing audio input without video, however, the mobile device, which is generally a mobile phone, is usually laid flat on a table or other surface. During teleconferencing that includes video, the mobile device is usually held in a user's hand or placed on a surface so as to remain in a portrait orientation. In order to make the device work in different orientations (both landscape and portrait), more microphones are needed than is required to make the device work in only one orientation. In the past, additional microphones have been incorporated into mobile devices to render the mobile devices operable in multiple orientations.

Referring now to the Figures, in some embodiments described herein, audio capture parameters in real time can be optimized by adjusting the locations of microphones relative to other microphones. To do so, the microphones are located on a moving part of a mobile device (e.g., a slidable, foldable, or otherwise operable part), or the mobile device itself may be bendable or otherwise configurable by the user.

In other embodiments, microphones may be intentionally located on moving parts of the mobile device such that when the parts are moved, various effects may be realized. For example, upon moving parts of the mobile device, an application may be triggered to start, a microphone may move to a location that provides for the optimal capture of audio for the application, and/or another sensor may be revealed (e.g., a camera or additional microphone may be revealed from behind the moving part).

In still other embodiments, a microphone may be located on a moving part of the mobile device such that in one position of the moving part the microphone is optimal for recording in one orientation of the mobile device and in another position of the moving part the microphone is optimal for another orientation of the mobile device.

In still other embodiments, a moving part of the mobile device may be used to open and close microphone ports so that the effective microphone position varies. In such embodiments, the moving part may simultaneously start an application for which the new effective microphone position is preferred over the previous microphone position. Additionally, or in the alternative, the moving part may reveal another sensor or a camera.

In still other embodiments, a user interface (UI) may prompt a user to move the moving part so that microphones are moved to an optimal position for a current application. This can be done, for example, by providing audio output to the user through a headphone audio system where quality problems caused by suboptimal microphone locations are exaggerated or, for example, cause the illumination of a light near the microphone that should be moved.

Figure 1B:
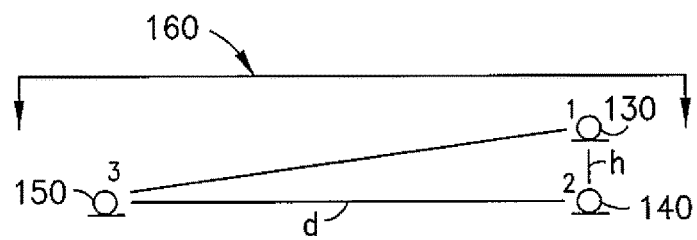
FIG. 1B is a schematic representation of positions of microphones in the mobile device in the orientation of FIG. 1A.

Referring more specifically now to FIG. 1A, a mobile device is designated generally by the reference number 100 and is hereinafter referred to as "device 100." Device 100 comprises a handset 110 having a slidable cover 120. As shown, a first microphone 130 is located on the handset 110, and a second microphone 140 and a third microphone 150 are located on the slidable cover 120. When the device 100 is positioned in a landscape mode for video recording, a horizontal plane 160 is generally perpendicular to the device 100. When the horizontal plane 160 is generally perpendicular to the device 100, the microphones 130, 140, 150 are positioned relative to each other on the horizontal plane as shown in FIG. 1B in which the first microphone 130 is separated from the second microphone 140 by a distance h and the second microphone 140 is separated from the third microphone by a distance d. In this mode, the microphones 130, 140, 150 are in optimal recording positions for video recording.

Figure 2A:
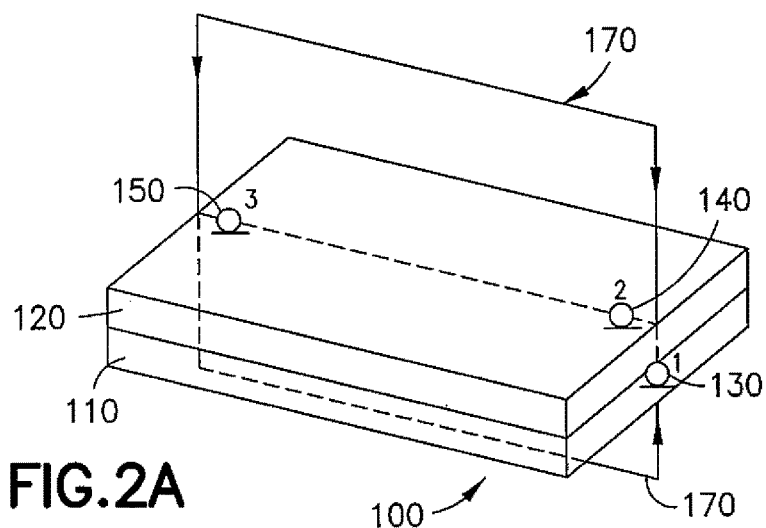
FIG. 2A is a perspective view of the mobile device with a cover thereof closed.
Figure 2B:
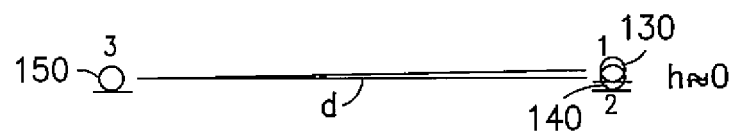
FIG. 2B is a schematic representation of positions of microphones in the mobile device in the orientation of FIG. 2A.

However, when the device 100 is closed and positioned flat on a table or other surface as shown in FIG. 2A in preparation for an audio teleconferencing application, a vertical plane 170 is generally perpendicular to the device 100. In this configuration of the microphones, the same microphones 130, 140, 150 are positioned on the vertical plane 170 and thus generally cannot be used for detecting sound source directions since the distance h≈0, as shown in FIG. 2B.

Figure 3A:
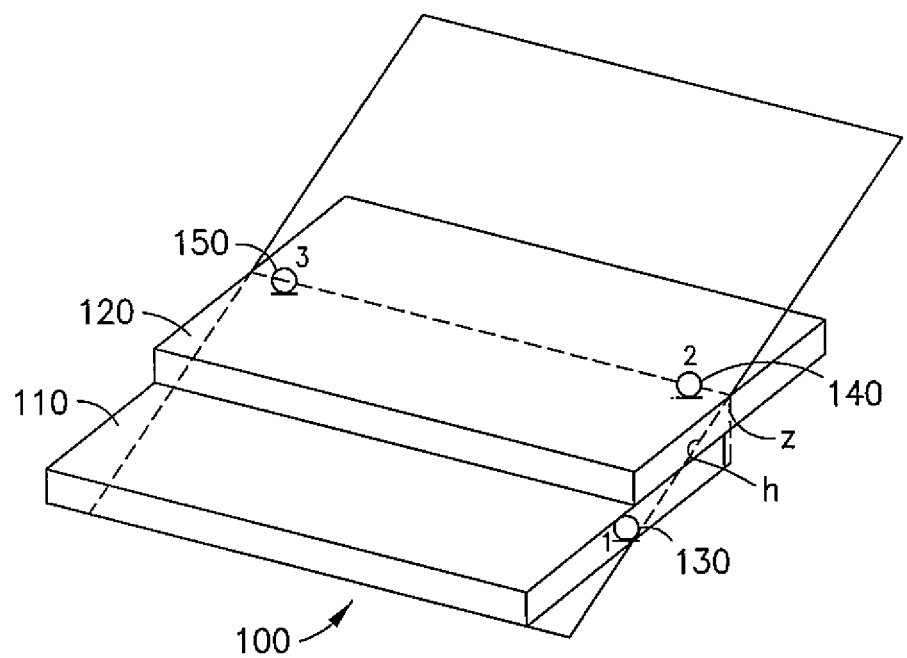
FIG. 3A is a perspective view of the mobile device in an audio capture orientation.
Figure 3B:
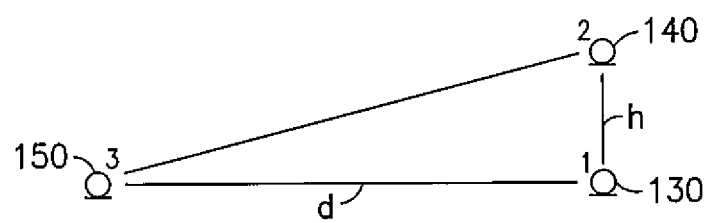
FIG. 3B is a schematic representation of positions of microphones in the mobile device in the orientation of FIG. 3A.

Referring now to FIG. 3A, when the slidable cover 120 is opened for the audio teleconferencing application, the microphones 130, 140, 150 are moved to optimal positions. Referring now to FIG. 3B, the distances d and h can be used for the capture of spatial audio directly from the microphones 130, 140, 150. The small elevation distance z (FIG. 3A) denoting the distance between the second microphone 140 located on the slidable cover 120 and the first microphone 130 located on the handset 110 is negligible as long as h is approximately greater than z.

Referring to FIGS. 1A-3B, the presence of a non-zero distance h enables the microphones 130, 140, 150 of the device 100 to discern whether a sound is arriving from in front of or behind the device 100.

To determine the optimal positions for the microphones 130, 140, 150 in the audio teleconferencing application, a method of directional analysis which is directly based on a correlation between audio channels defined by positions of the microphones 130, 140, 150 is selected. The direction of arriving sound is estimated independently for B frequency domain subbands in an effort to find the direction of a perceptually dominating sound source for every subband.

In such a method of directional analysis, every input channel k=1, . . . , 3 is transformed to a frequency domain using discrete Fourier transform (DFT). Sinusoidal windows with 50% overlap and an effective length of 20 milliseconds (ms) are used. Before the DFT transform $D_{tot}=D_{max}+D_{HRTF}$, zeroes are added to the end of the window. $D_{max}$ corresponds to the maximum delay in samples between the microphones. In the microphone setup presented in FIGS. 1A and 1B, the maximum delay is obtained as:

$$D_{max} = \frac{dF_s}{v} \quad (1)$$

where $F_s$ is the sampling rate of signal and v is the speed of the sound in the air. $D_{HRTF}$ is the maximum delay caused to the signal by head-related transfer function (HRTF) processing. After the DFT transform, the frequency domain representation $X_k(n)$ of all three channels, k=1, . . . , 3, n=0, . . . , N−1, is presented. N is the total length of the window considering the sinusoidal window (length $N_s$) and the additional $D_{tot}$ zeroes.

Frequency domain representation is divided into B subbands:

$$X_k^b(n)=X_k(n_b+n), n=0, \ldots, n_{b+1}-n_b-1, b=0, \ldots, B-1 \quad (2)$$

where $n_b$ is the first index of the bth subband. The widths of the subbands can follow, for example, the equivalent rectangular bandwidth (ERB) scale.

For every subband, the directional analysis is performed. In doing so, the direction in which a sound source is located is estimated using two audio channels (for example, the channels defined by the positions of the second microphone 140 and the third microphone 150). The task is to find delay $\tau_b$ that maximizes the correlation between two channels for subband b. Frequency domain representation of, e.g., $X_k^b$(n), can be shifted $\tau_b$ time domain samples using:

$$X_{k,\tau_b}^b(n) = X_k^b(n) e^{-j\frac{2\pi n \tau_b}{N}}. \tag{3}$$

Now the optimal delay is obtained from:

$$\max_{\tau_b} \operatorname{Re}\left( \sum_{n=0}^{n_{b+1}-n_b-1} \left( X_{2,\tau_b}^b(n) * \overline{X_3^b(n)} \right) \right), \tau_b \in [-D_{max}, D_{max}] \tag{4}$$

where Re indicates the real part of the result and — denotes the complex conjugate. $X_{2,\tau_b}^b$ and $X_3^b$ are considered vectors with length of $n_{b+1}-n_b$ samples. Resolution of one sample is generally suitable for the search of the delay. With the delay information, a sum signal is created using the following logic:

$$X_{sum}^b = \begin{cases} (X_{2,\tau_b}^b + X_3^b)/2 & \tau_b \geq 0 \\ (X_2^b + X_{3,-\tau_b}^b)/2 & \tau_b < 0 \end{cases} \tag{5}$$

In the sum signal, the content of the channel in which an event occurs first is added as such, whereas the channel in which the event occurs later is shifted to obtain the best match. Shift $\tau_b$ indicates how much closer the sound source is to the second microphone 140 than the third microphone 150. The actual distance can be calculated as:

$$\Delta_{23} = \frac{v \tau_b}{F_s} \tag{6}$$

Figure 4:
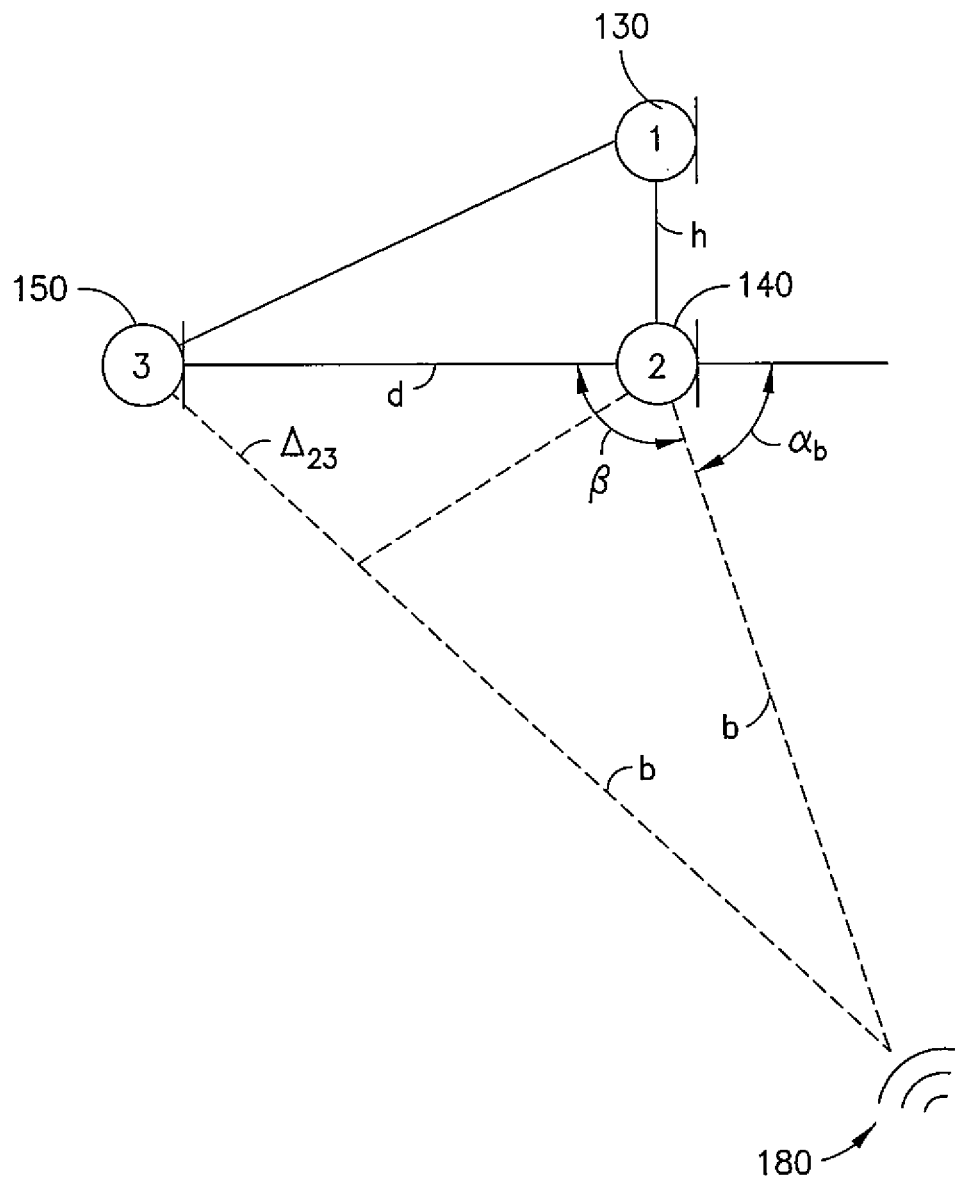
FIG. 4 is a graphical representation of the calculation of an angle of sound arriving at a device having a plurality of microphones.

Utilizing basic geometry on the setup in FIGS. 1A and 1B, and referring now to FIG. 4, it can be calculated that the angle of the arriving sound from a source 180 is equal to:

$$\alpha_b = \pm \cos^{-1}\left( \frac{\Delta_{23}^2 + 2b\Delta_{23} - d^2}{2db} \right) \tag{7}$$

where d is the distance between the second microphone 140 and the third microphone 150 and where b is the estimated distance between the source 180 and the nearest microphone (the second microphone 140, as shown in FIG. 4). Typically b can be set to a fixed value. For example, b=2 meters has been found to provide stable results.

There are two alternatives for the direction of the arriving sound as the exact direction cannot be determined with only two microphones. One is from the front and the other is from behind the microphones. The third microphone is utilized to define which of the signs in equation (7) is correct:

$$\max_{\delta_b} \operatorname{Re}\left( \sum_{n=0}^{n_{b+1}-n_b-1} \left( X_{2,\delta_b}^b(n) * \overline{X_1^b(n)} \right) \right), \delta_b \in \left[ -\frac{hF_s}{v}, \frac{hF_s}{v} \right] \tag{8}$$

where $\delta_b$ is the delay between first and second channels ($X_1$ and $X_2$), the first channel being shifted relative to the second channel to achieve maximum correlation, and the delay being calculated for each frequency band b. If $\delta_b$ is positive, then the source 180 is closer to the second microphone 140 than the first microphone 130 and thus $\alpha_b$ is positive:

$$\alpha_b = \begin{cases} \alpha_b & \delta_b \geq 0 \\ -\alpha_b & \delta_b < 0 \end{cases}. \tag{9}$$

Thus, it can be determined for each frequency band which direction the sound is coming from. In particular, h is the height of the triangle and depends on whether the cover is open or closed and in which orientation the phone is placed. This h can be calculated when the microphone placement and the cover position are known. For example:

| H (meters) | |
|---|---|
| 0.01 | Landscape orientation, cover closed, device thickness = 10 millimeters (mm) |
| 0.0001 | Teleconference orientation, cover closed |
| 0.0199 | Teleconference orientation, cover open, slide distance = 20 mm |

In other exemplary embodiments, a slidable camera lens cover can be used to optimize microphone positions in different applications. One microphone may be placed on a camera lens cover over a camera lens in a mobile device. The microphone positions in the device body and the lens cover may be such that when the lens cover is closed the microphone positions are optimal for recording speech for voice communications, and when the cover is open the microphone positions are optimal for recording stereo video.

Figure 5A:
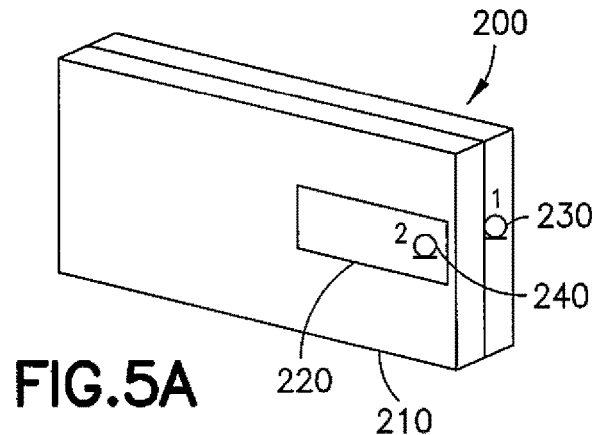
FIG. 5A is a perspective view of a camera with a lens cover in a closed position.
Figure 5B:
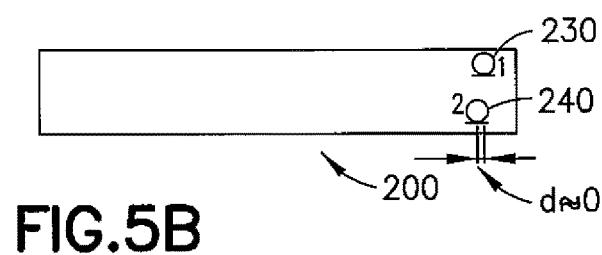
FIG. 5B is a top view of the camera of FIG. 5A showing positions of microphones in the camera.

Referring now to FIGS. 5 and 6, an example of such an arrangement is shown. As shown in FIGS. 5A and 5B, for high quality noise cancellation for voice communications, a device 200 (such as a camera) has a first microphone 230 on a body portion 210 and a second microphone 240 on a slidable cover 220. The device 200 is configured such that the microphones 230, 240 are arranged to be close to each other. The microphones 230, 240 are also located so that they are close to the user's mouth when the device 200 is held in a normal talking position. If the microphones 230, 240 are close and aligned as shown in FIG. 5A, beamforming may be used to obtain optimal voice quality in noisy environments. However, the same positioning may be less than desirable with regard to obtaining stereo recording in a video recording using the device 200 since the distance d in FIG. 5B is essentially zero.

Figure 6A:
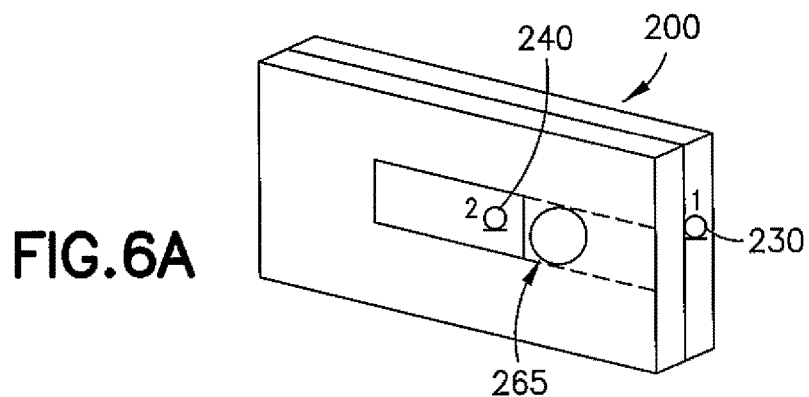
FIG. 6A is a perspective view of a camera with a lens cover in an open position.
Figure 6B:
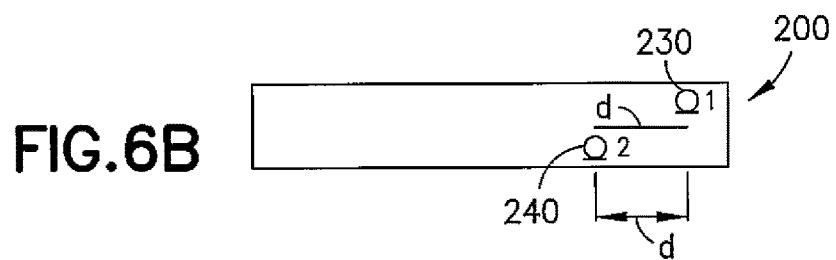
FIG. 6B is a top view of the camera of FIG. 6A showing positions of microphones in the camera.

As shown in FIG. 6A, when the second microphone 240 is on the slidable cover 220 of the device 200 (when the device 200 is a camera and the slidable cover 220 is a lens cover over a lens 265), then the slidable cover 220 is moved when the camera is used for video recording. The position to which the second microphone 240 moves when the slidable cover 220 is opened is more suitable for stereo recording since, as shown in FIG. 6B, the distance d is greatly increased relative to the distance d as shown in FIG. 5B.

Figure 7:
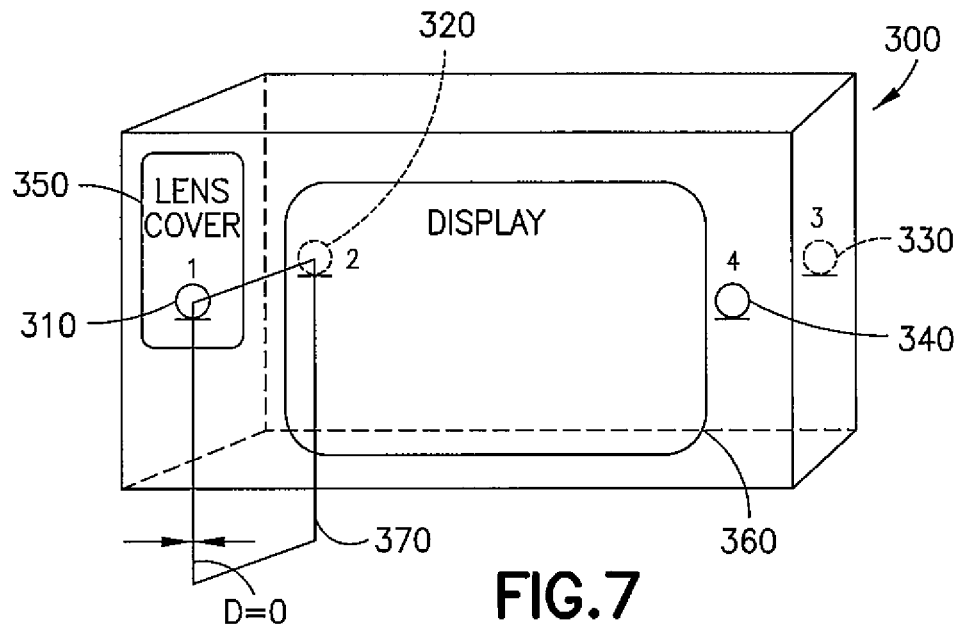
FIG. 7 is a perspective view of a camera in a landscape orientation showing locations of four microphones.
Figure 8:
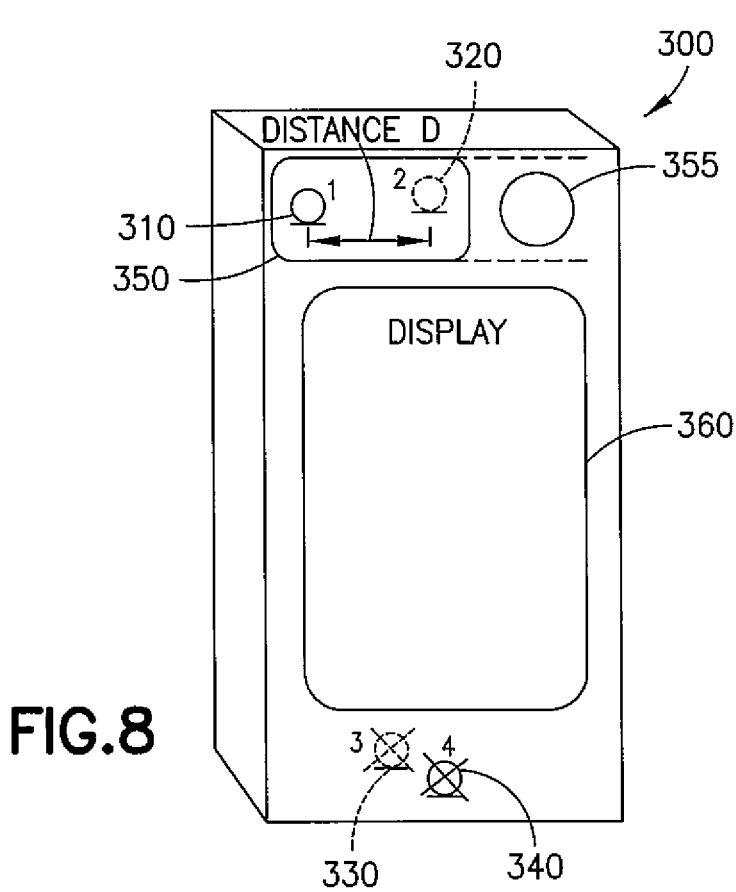
FIG. 8 is a perspective view of a camera in a video call orientation showing locations of four microphones.

Referring now to FIGS. 7 and 8, another example of such an arrangement is shown. A mobile device 300 may be configured to have four microphones, namely, a first microphone 310, a second microphone 320, a third microphone 330, and a fourth microphone 340, arranged as shown in FIG. 7. The first microphone 310 is located on a slidable member such as a slidable lens cover 350, which is located adjacent to a display 360 on a surface of the mobile device 300. Such an arrangement of microphones on the mobile device 300 is optimal for noise cancellation with beamforming in normal voice communications and also for multichannel audio capture during videography using the mobile device in a landscape orientation.

However, the arrangement of FIG. 7 may not be optimal for video calls, where the mobile device 300 is held in a portrait orientation and where stereo audio is desired, as shown in FIG. 8. In particular, if the slidable lens cover 350 is not moved to an open position to expose a lens 355, a distance D separating the first microphone 310 and the second microphone 320 (when both microphones are located on a plane 370) would be zero, as shown in FIG. 7. In such a configuration of the microphones, stereo recording would be impossible. Also, in holding the mobile device 300 in the portrait orientation, as shown in FIG. 8, the third microphone 330 and the fourth microphone 340 would be blocked by the user's hand.

Figure 9:
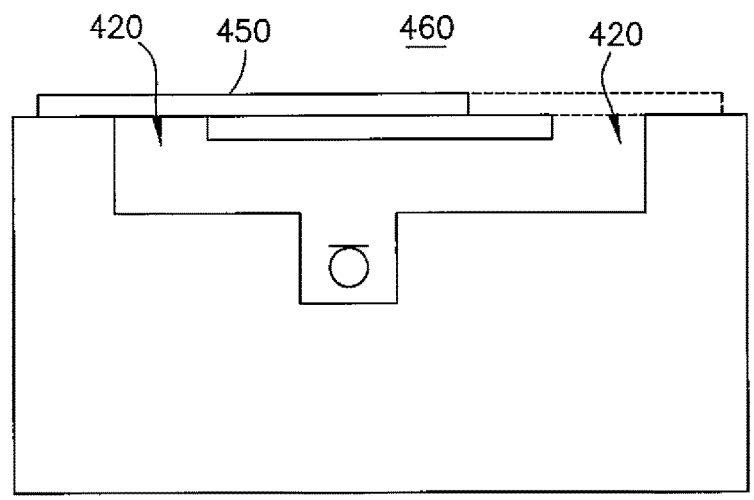
FIG. 9 is a schematic view of a device showing a part that is moved to open and close a port in which a microphone is located.

As shown in FIG. 9, the slidable member on a mobile device 400 is not limited to being a slidable lens cover, as it may be a slidable switch 450 or the like. Moving the slidable switch 450 may open an application where a new position of a microphone 410 (after sliding) improves quality of the captured audio. In doing so, the actual position of the microphone 410 may not change. Moving the slidable switch 450 may open and cover ports 420 through which sound can be transmitted, such ports 420 connecting the microphone 450 to the environment 460 outside the mobile device 400.

Figure 10:
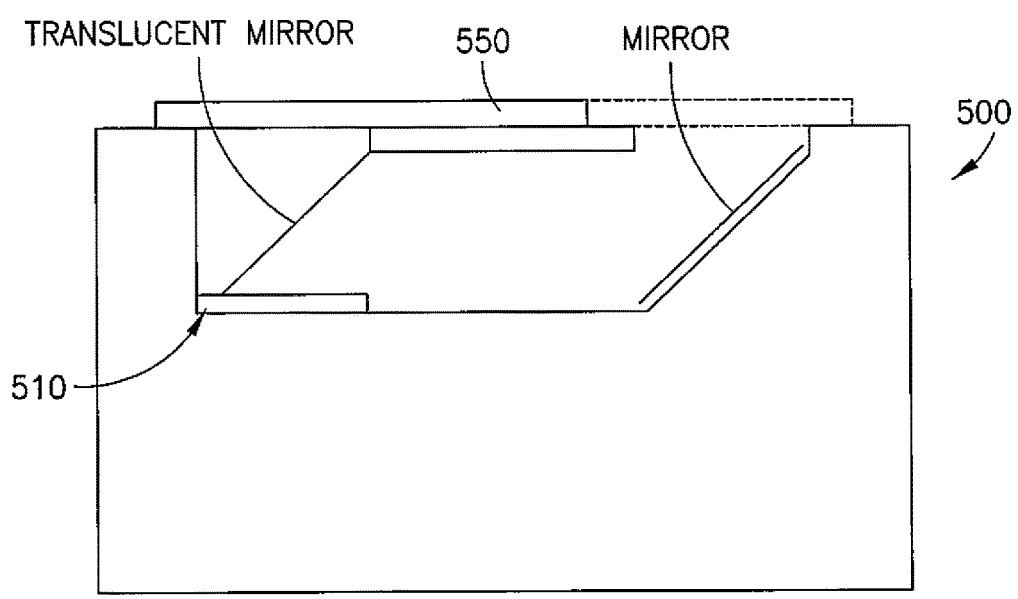
FIG. 10 is a schematic view of a device showing a part that is moved to open and close a port to move an apparent location of a sensor in the device.

Referring now to FIG. 10, in some exemplary embodiments of a mobile device 500, it may be possible to move the apparent location of a video sensor 510 upon manipulation of a slidable cover 550 without moving the video sensor 510 itself. For example, moving the apparent location of the video sensor 510 (when the video sensor 510 is a camera lens) may be beneficial when depth maps are created with two cameras. If one of the cameras can be moved, then the apparent distance (which determines the optimum range for depth map calculation) between the two cameras is changed, and the depth maps can be made to work for a larger range of depths. However, this is not limited to an arrangement using two cameras, as it is possible to take two consecutive pictures with a single camera such that the apparent position of the camera is changed between the two pictures. If the two consecutive pictures are taken in quick succession from the same camera with a small but minimal movement of the camera, a depth map may then be calculated from the two pictures.

In any of the exemplary embodiments disclosed herein, a user may be notified to change microphone locations to achieve optimal performance. For example, if a device is oriented in a landscape mode and is in an open position or is on a table in a closed position, then the microphones of the device are likely in suboptimal positions. Device orientation can be detected using accelerometers inside the device. In such embodiments, the device notifies the user of a need to slide the device open or closed for optimal performance. This can be performed by a number of different methods. For example, the device may show a video or moving graphic of a cover sliding to an open position or to a closed position; the device may play a sound that corresponds to a sound that comes from opening or closing the cover; the device may show a text such as "please open/close cover"; or the device may provide an audio instruction such as "please open/close cover." Another method may be such that if audio is monitored during a video capture (e.g., from headphones or the like), the device could exaggerate a low quality audio signal caused by the moving parts of the device being in suboptimal positions for the current audio recording use case. For example, if the current position of the microphones causes the stereo image to be very narrow, the device could play back the audio signal to the monitoring headphones in mono and switch back to stereo once the microphone positions are changed to the optimal position. Still another method may be to show a red light next to a microphone that is in a suboptimal position. The light gradually turns green when the moving part with the microphone is moved to the optimal position. Combinations of the foregoing methods are also possible.

To improve suboptimal microphone locations, in some cases the user may choose to ignore the prompting to slide the cover open or closed. In this case, the device operates under the existing parameters. For example, if the height h of the triangle in FIGS. 1-3 is too small, the device can either switch to recording stereo instead of multichannel 5.1 audio or binaural sound; the angle of the arriving sound (in Equation (7) above) can always be chosen to be positive, indicating that all directional sounds are rendered from the front of the device; or the device can record stereo but can use a blind surround upmixing algorithm (e.g., DOLBY PROLOGIC or the like) to create multichannel 5.1 audio from the stereo.

In other efforts to improve suboptimal microphone locations, adaptations may be made when the microphone locations are constantly changing. In bendable products such as a bendable mobile phone, the microphone locations with respect to each other may change continuously. With such devices the parameters d and h in the above equations are constantly updated. For example, the bendable mobile phone may calculate new d and h values for the multichannel 5.1 audio or binaural capture algorithm once for every window. These values are used for that window only and the next window may have different values.

Information regarding the directions of the sound sources may be used for applications other than multichannel 5.1 audio capture or binaural audio capture. For example, sound directions may be used in the control of games.

In any of the exemplary embodiments described above, it is possible to use a mobile device for audio recording in more orientations without incorporating additional microphones.

Figure 11:
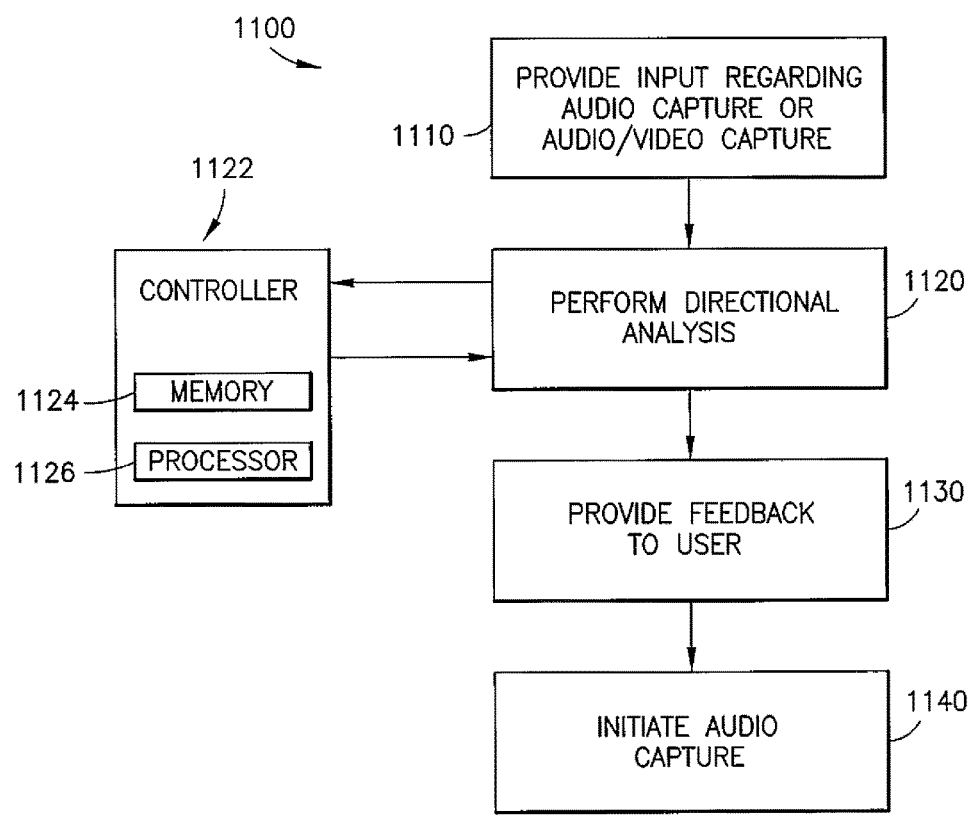
FIG. 11 is a flow of one exemplary method of optimizing audio capture parameters in real time for a mobile device.

Referring now to FIG. 11, one exemplary method of optimizing audio capture parameters in real time for a mobile device is designated generally by the reference number 1100 and is hereinafter referred to as "method 1100." In the method 1100, input is designated regarding either a purely audio capture or a combination of audio and video capture. This input is embodied in an input step 1110. An analysis step 1120 is then executed in which directional analysis is performed to determine the optimal positions for microphones. The analysis step 1120 is carried out by a controller 1122 having a memory 1124 and a processor 1126. Feedback regarding optimal positions for the microphone(s) is then provided in a feedback step 1130. The feedback may comprise instructions to the user as to whether a slidable cover should be open or closed, whether the mobile device should be arranged in a landscape or portrait orientation, and/or the like. Audio capture is then carried out in an audio capture step 1140.

An apparatus comprises at least one processor, and at least one memory including computer program code, the at least one memory and the computer program code configured to, with the at least one processor, cause the apparatus to: provide an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second position of a second microphone configuration on a second portion, the second portion being movable relative to the first portion. The apparatus may be further caused to determine an optimal microphone configuration for the audio capture event using a directional analysis based on a correlation between audio channels defined by the first position of the first microphone configuration and the second position of the second microphone configuration. The apparatus may be further caused to provide a feedback regarding optimal positions for the first microphone configuration and the second microphone configuration for subsequent adjustment of the positions of the first microphone configuration and the second microphone configuration. The apparatus may be further caused to determine relative positions of the first microphone configuration and the second microphone configuration and configure the first microphone configuration and the second microphone configuration for optimal performance. The apparatus may be further caused to provide an indication to a user for the user to configure the first microphone configuration and the second microphone configuration for optimal performance. The second portion may be a cover, a slidable cover, a foldable portion, or a bendable portion of the apparatus. The first portion may include a camera and the second portion may be a slidable lens cover. The apparatus may further comprise a third microphone configuration. When the apparatus is positioned flat, a vertical plane through the first microphone configuration, the second microphone configuration, and the third microphone configuration may define a horizontal distance of zero between the first microphone configuration and the second microphone configuration when the apparatus is in the first position, and an optimal position for the audio capture event may comprise a horizontal non-zero distance between the first microphone configuration and the second microphone configuration when the apparatus is in the second position. The first microphone configuration and the second microphone configuration may comprise directional microphones. At least one of the first and second microphone configurations may comprise at least one of a microphone, one or more sound channels, and one or more sound inlets through which sound can be transmitted, the microphone being acoustically coupled to the one or more sound channels and the one or more sound inlets. At least one of the first and second microphone configurations may be modified by the movement of the second portion relative to the first portion. An electronic mobile device may comprise the apparatus.

A method comprises providing an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second position of a second microphone configuration on a second portion, the second portion being movable relative to the first portion. The method may further comprise determining an optimal microphone configuration for the audio capture event using a directional analysis based on a correlation between audio channels defined by the first position of the first microphone configuration and the second position of the second microphone configuration. Using a directional analysis may further comprise transforming a plurality of input channels to a frequency domain using discrete Fourier transform. The method may further comprise dividing the frequency domain into subbands. The method may further comprise providing a feedback regarding optimal positions for the first microphone configuration and the second microphone configuration for subsequent adjustment of the first position of the first microphone configuration and the second position of the second microphone configuration. The method may further comprise determining relative positions of the first microphone configuration and the second microphone configuration and configuring the first and second microphone configurations for optimal performance. An indication may be provided to a user for the user to configure the microphone configurations for optimal performance. The microphone configuration may be further defined by a third microphone configuration on the first portion or the second portion. Providing a feedback regarding optimal positions for the plurality of microphones may comprise one or more of exaggerating a low quality audio output to the user, illuminating a light, providing a text graphic, and providing an audio instruction.

In a non-transitory computer readable storage medium encoded with instructions that, if executed by a computer, perform a process, the process comprises providing an audio capture event wherein one or more microphone configurations are configured to provide one or more audio signals based on at least one acoustic signal from at least one acoustic source, at least one of the one or more microphone configurations being defined by a first position of a first microphone configuration on a first portion and a second microphone configuration on a second portion, the second portion being movable relative to the first portion between the first position and a second position.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:
   at least one processor,
   and at least one memory including computer program code,
   the at least one memory and the computer program code configured to, with the at least one processor, cause the apparatus to:
   provide an audio capture event in at least one of a first orientation and a second orientation, wherein the audio capture event is a spatial audio capture, wherein one or more microphone configurations provide one or more audio signals comprising one or more frequency domain subbands based on at least one acoustic signal when the apparatus is in one of the first orientation and the second orientation, wherein at least one acoustic source is external to the apparatus, at least one of the one or more microphone configurations being defined by a first position of a first microphone configuration on a first portion defining a first audio channel and a second position of a second microphone configuration on a second portion defining a second audio channel, the second portion being movable relative to the first portion to provide the spatial audio capture in at least one of the first orientation and the second orientation;

determine a direction of a dominating sound from the at least one acoustic source for one or more of the one or more frequency domain subbands;

correlate the first audio channel to the second audio channel based on the determined direction;

provide a feedback to a user, the feedback based on the correlation of the first audio channel to the second audio channel, regarding positions for the first microphone configuration and the second microphone configuration for subsequent adjustment of the first position of the first microphone configuration and the second position of the second microphone configuration depending on the apparatus being in one of the first orientation and the second orientation so as to indicate to the user to configure at least one of the first position of the first microphone configuration and the second position of the second microphone configuration where at least one microphone is moved to a recording position for the spatial audio capture depending on whether the first orientation or the second orientation is in use.

2. The apparatus of claim 1, wherein the apparatus is configured to determine a microphone configuration for the audio capture event using a directional analysis based on the correlation between the first audio channel defined by the first position of the first microphone configuration and the second audio channel defined by the second position of the second microphone configuration.

3. The apparatus of claim 1, wherein the apparatus is configured to determine relative positions of the first microphone configuration and the second microphone configuration and configures the first microphone configuration and the second microphone configuration for performance.

4. The apparatus of claim 1, wherein the second portion is a cover, a slidable cover, a foldable portion, an operable section, or a bendable portion of the apparatus.

5. The apparatus of claim 1, further comprising a third microphone configuration on the first portion or the second portion.

6. The apparatus of claim 5, wherein when the apparatus is positioned flat, a vertical plane through the first microphone configuration, the second microphone configuration, and the third microphone configuration define a horizontal distance of zero between the first microphone configuration and the second microphone configuration when the first microphone configuration is in the first position, and wherein a position for the audio capture event comprises a horizontal non-zero distance between a first microphone and a second microphone when the second microphone configuration is in the second position.

7. The apparatus of claim 1, wherein at least one of the first microphone configuration and the second microphone configuration comprises at least one of,
a microphone,
one or more sound channels, and
one or more sound inlets through which sound can be transmitted,
wherein the microphone is acoustically coupled to the one or more sound channels and the one or more sound inlets.

8. The apparatus of claim 1, wherein the at least one of the first microphone configuration and the second microphone configuration is modified by a movement of the second portion relative to the first portion.

9. An electronic mobile device comprising the apparatus of claim 1.

10. The apparatus of claim 1, wherein the first position of the first microphone configuration and the second position of the second microphone configuration for performance is based on an independent estimation of directions of arriving sounds.

11. A method, comprising:
capturing an audio event at an apparatus in at least one of a first orientation and a second orientation, wherein the audio capture event is a spatial audio capture, wherein the capturing is performed with a first microphone configuration and with a second microphone configuration, wherein one or more microphone configurations of the first microphone configuration and the second microphone configuration are configured to provide one or more audio signals comprising one or more frequency domain subbands based on at least one acoustic signal in one of the first orientation and the second orientation, wherein at least one acoustic source is external to the apparatus, at least one of the one or more microphone configurations being defined by a first position of the first microphone configuration on a first portion defining a first audio channel and a second position of the second microphone configuration on a second portion defining a second audio channel, the second portion being movable relative to the first portion to provide the spatial audio capture in at least one of the first orientation and the second orientation;

determining a direction of a dominating sound from the at least one acoustic source for one or more of the one or more frequency domain subbands;

correlating the first audio channel to the second audio channel based on the determined direction;

providing a feedback to a user, the feedback based on the correlation of the first audio channel to the second audio channel, regarding positions for the first microphone configuration and the second microphone configuration for subsequent adjustment of the first position of the first microphone configuration and the second position of the second microphone configuration depending on the apparatus being in one of the first orientation and the second orientation so as to indicate to the user to configure at least one of the first position of the first microphone configuration and the second position of the second microphone configuration where at least one microphone is moved to a recording position for the spatial audio capture depending on whether the first orientation or the second orientation is in use.

12. The method of claim 11, further comprising determining a microphone configuration for the audio capture event using a directional analysis based on the correlation between the first audio channel defined by the first position of the first microphone configuration and the second audio channel defined by the second position of the second microphone configuration.

13. The method of claim 12, wherein using the directional analysis further comprises transforming a plurality of input channels to a frequency domain using discrete Fourier transform.

14. The method of claim 11, further comprising determining relative positions of the first microphone configuration and the second microphone configuration and configuring the first microphone configuration and the second microphone configuration for performance.

15. The method of claim 11, wherein the one or more microphone configurations is further defined by a third position of a third microphone configuration on the first portion or the second portion.

16. The method of claim 11, wherein providing the feedback regarding positions for the first microphone configuration and the second microphone configuration comprises one or more of exaggerating a low quality audio output to the user, illuminating a light, providing a text graphic, and providing an audio instruction.

17. The method of claim 11, further comprising providing an independent estimation of directions of arriving sounds to determine positions for the first microphone configuration and the second microphone configuration.

18. A non-transitory computer readable storage medium encoded with instructions that, if executed by a computer, perform a process, the process comprising:

provifing an audio capture event at an apparatus in at least one of a first orientation and a second orientation, wherein the audio capture event is a spatial audio capture, wherein one or more microphone configurations provide one or more audio signals comprising one or more frequency domain subbands based on at least one acoustic signal when the apparatus is in one of the first orientation and the second orientation, wherein at least one acoustic source is external to the apparatus, at least one of the one or more microphone configurations being defined by a first position of a first microphone configuration on a first portion defining a first audio channel and a second position of a second microphone configuration on a second portion defining a second audio channel, the second portion being movable relative to the first portion to provide the spatial audio capture in at least one of the first orientation and the second orientation;

determining a direction of a dominating sound from the at least one acoustic source for one or more of the one or more frequency domain subbands;

correlating the first audio channel to the second audio channel based on the determined direction;

providing a feedback to a user, the feedback based on the correlation of the first audio channel to the second audio channel, regarding positions for the first microphone configuration and the second microphone configuration for subsequent adjustment of the first position of the first microphone configuration and the second position of the second microphone configuration depending on the apparatus being in one of the first orientation and the second orientation so as to indicate to the user to configure at least one of the first position of the first microphone configuration and the second position of the second microphone configuration where at least one microphone is moved to a recording position for the spatial audio capture depending on whether the first orientation or the second orientation is in use.

\* \* \* \* \*